Figure 3:
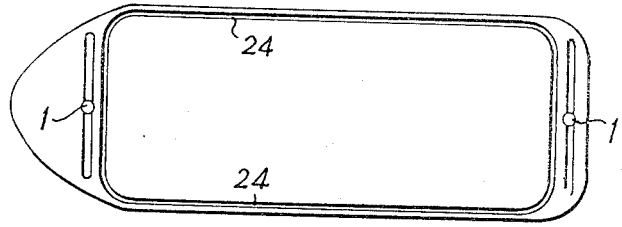

Oct. 4, 1966     C. S. COCKERELL     3,276,392
VEHICLES FOR TRAVELLING OVER A SURFACE
Filed Nov. 10, 1964     4 Sheets-Sheet 1
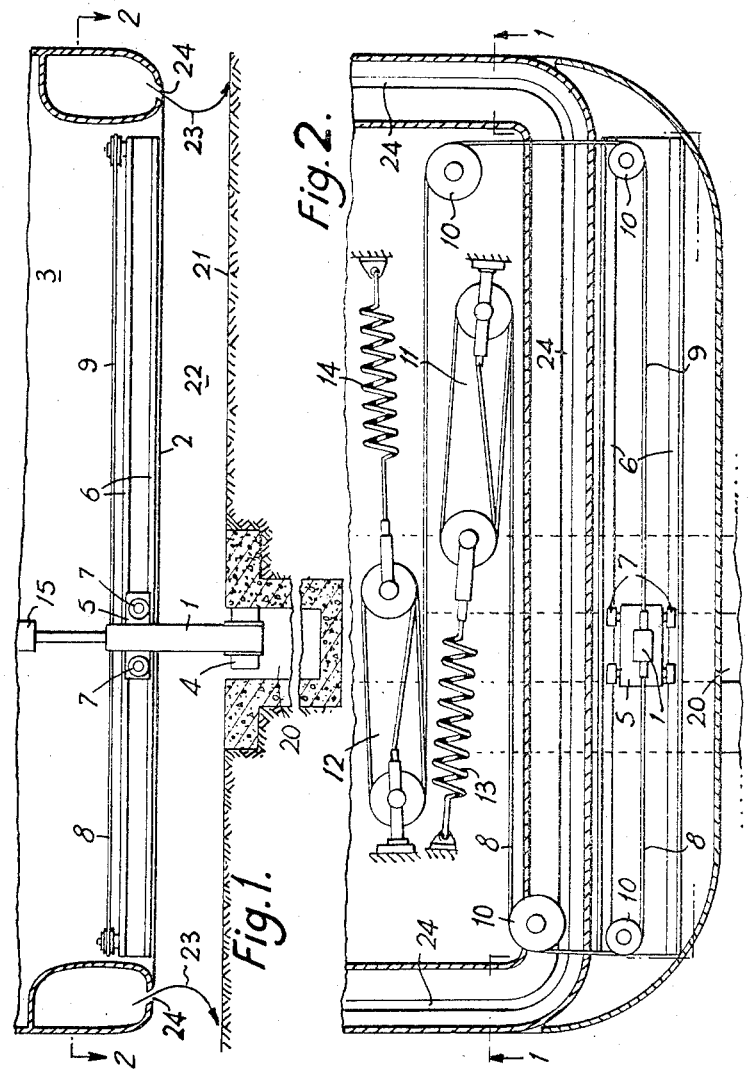
INVENTOR
C. S. COCKERELL
BY
Cameron, Kerkam & Sutton
ATTORNEYS Oct. 4, 1966     C. S. COCKERELL     3,276,392

VEHICLES FOR TRAVELLING OVER A SURFACE

Filed Nov. 10, 1964     4 Sheets-Sheet 2

INVENTOR
C. S. COCKERELL
BY
Cameron, Kerkam & Sutton
ATTORNEYS

Oct. 4, 1966     C. S. COCKERELL     3,276,392
VEHICLES FOR TRAVELLING OVER A SURFACE
Filed Nov. 10, 1964     4 Sheets-Sheet 4
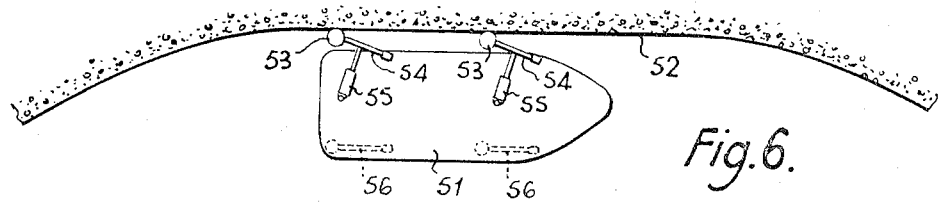
Fig.6.
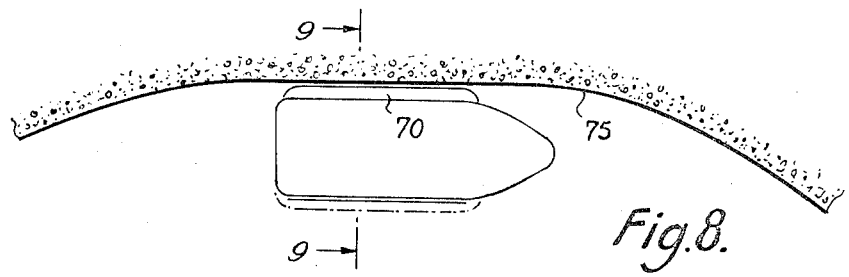
Fig.8.
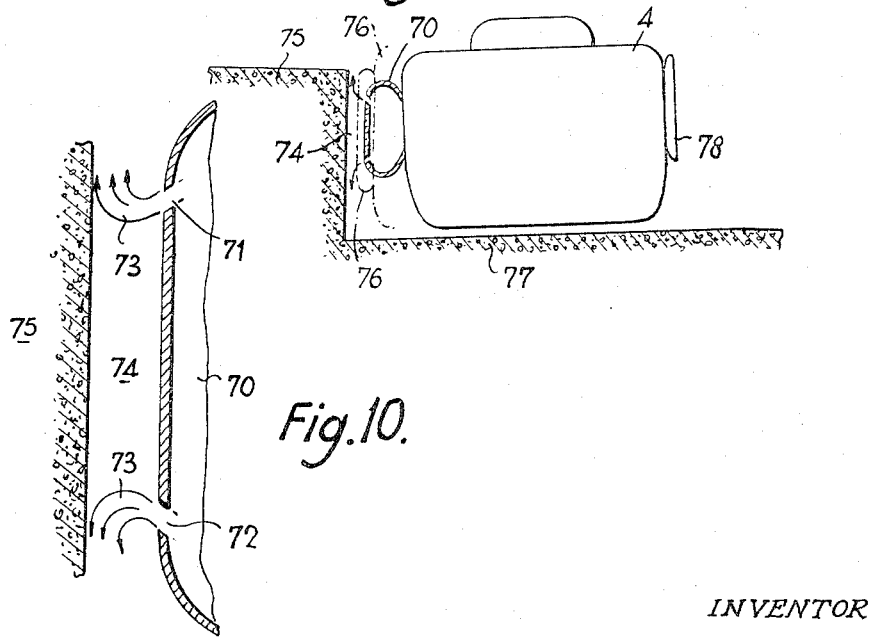
Fig.9.
Fig.10.
INVENTOR
C. S. COCKERELL
BY
Cameron, Kerkam & Sutton
ATTORNEYS United States Patent Office 3,276,392
Patented Oct. 4, 1966

3,276,392
VEHICLES FOR TRAVELLING OVER A SURFACE
Christopher Sydney Cockerell, Southampton, England, assignor to Hovercraft Development Limited, London, England, a British company
Filed Nov. 10, 1964, Ser. No. 410,195
Claims priority, application Great Britain, Nov. 11, 1963, 44,514/63; Mar. 20, 1964, 11,922/64
9 Claims. (Cl. 104—23)

This invention relates to vehicles for travelling over a surface and which are supported above that surface by at least one cushion of pressurised gas, and in particular, relates to guiding means for such vehicles enabling them to be accurately positioned relative to a structure, for example when docking, whilst avoiding damage to the vehicle by contact with the structure.

Other forms of vehicles, such as trains and cars, are always in contact with the surface and can be steered accurately to a predetermined position with little or no sideways movement. The same feature applies to aircraft in that they have contact with the ground when taxying and can therefore, again, be accurately steered. Ships do suffer from the disadvantage that sideways drift can occur and create difficulties when docking, but the construction of a ship is such that it can readily withstand fairly heavy contact with a structure without undue damage. A ship is, in any case, a relatively slow form of transport and relatively slow lengthy docking procedures are acceptable, so that the ship can be moved very slowly into the desired position, avoiding undue contact with any structure.

A gas-cushion supported vehicle is a relatively fast form of transport and it is desirable that the docking of such a vehicle should be rapid. If possible, the vehicle should be able to approach the structure forming a dock under its own power and be quickly and accurately positioned relative to the structure regardless of any sideways drift or movement which may be present. The vehicle can then be quickly unloaded, and reloaded, and leave the dock rapidly without danger of sideways drift occurring and causing contact between vehicle and dock. Normally, the vehicle is supported clear of the surface and considerable sideways drift can occur under the action of the wind and also when turning and unless this drift can be accurately controlled heavy contact with the structure of the dock will occur.

It is desirable that a gas-cushion supported vehicle should be of light construction and therefore would be very easily damaged by contact with a structure. If parts of the vehicle have to be made of sufficient strength to withstand such contact, considerable weight penalties are incurred.

For slow moving gas-cushion supported vehicles for operation over land it has been proposed to provide wheels which give direct control, whilst for slow-moving vehicles operating over water, side-walls can be provided which are always partly immersed and provide directional control. Such means cannot be provided for vehicles which are intended to operate over both land and water surfaces nor can they be provided for fast vehicles as high drag forces are created and considerable damage is likely to occur to the wheels or side-walls. If retractable wheels are provided, for use when docking over land, the sideways drift which is likely to be present at the time the wheels are brought into action will give rise to very high stresses in the wheel supports and they may collapse.

According to the invention there is provided a vehicle for travelling over a surface and which, in operation, is supported above that surface, at least in part, by a cushion of pressurised gas formed and contained beneath the vehicle, comprising at least one deflectable guide for engagement with path defining means in or on the surface, the guide being deflectable by deviation of the vehicle from a desired orientation and/or position relative to the defined path, and means for yieldably opposing deflection of the guide to bring the vehicle to the desired orientation and/or position relative to the defined path.

One or more guides can depend below the vehicle bottom and according to one feature of the invention a vehicle comprises at least one deflectable guide depending below the bottom surface of the vehicle for engaging with path defining means in or on the surface, deflection of the guide member being opposed by means acting to return the guide to a datum position.

In an alternative arrangement, guides can be positioned on one or both sides of a vehicle and according to a further feature of the invention a vehicle comprises at least one deflectable guide on at least one side of the vehicle to cooperate with path defining means on the surface, deflection of the guide being opposed by means tending to return the guide to a datum position.

Where the orientation of a vehicle is to be accurately controlled at least two deflectable guides can be provided and where the guides are on the side of a vehicle, such guides can be provided on both sides. In all arrangements, the guides can be retractable.

Figure 4:
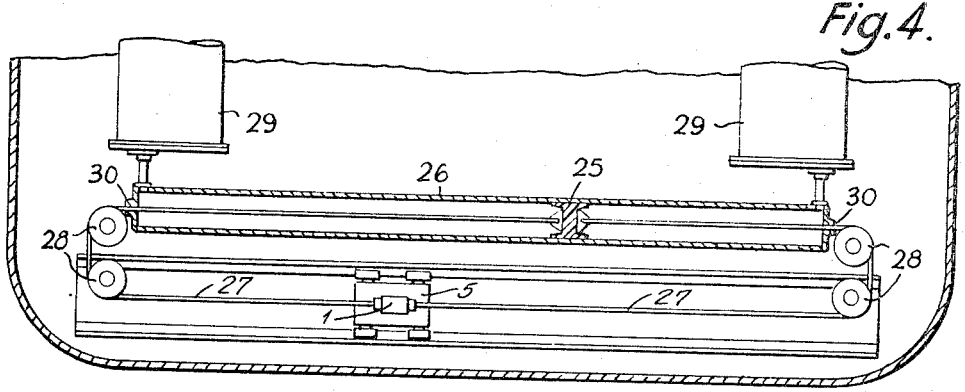
Figure 7:
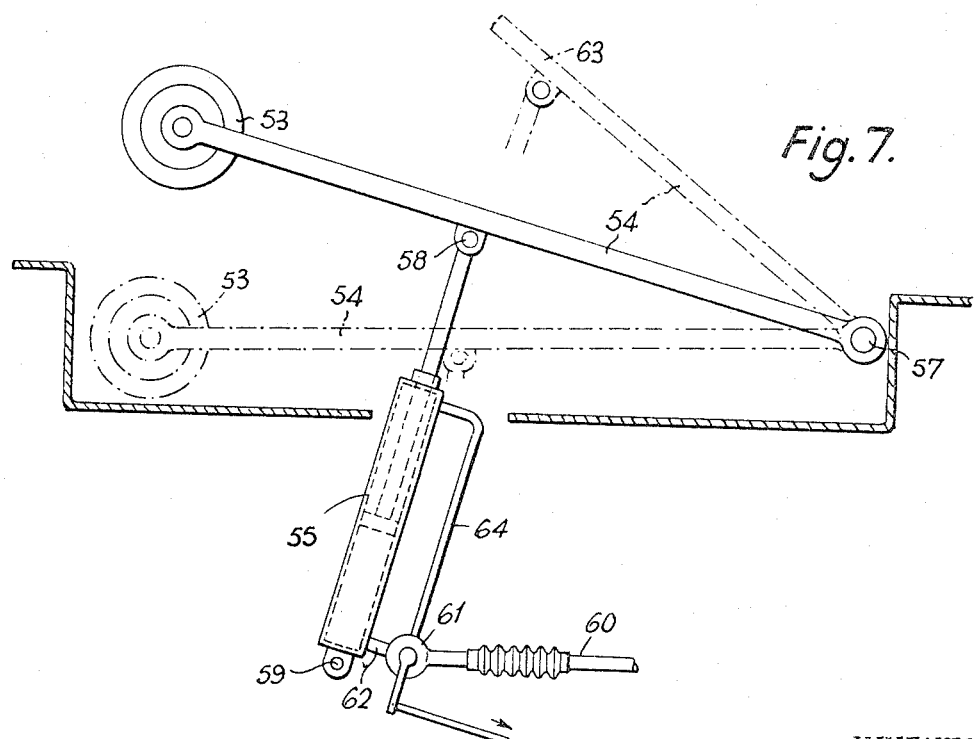
Figure 5:
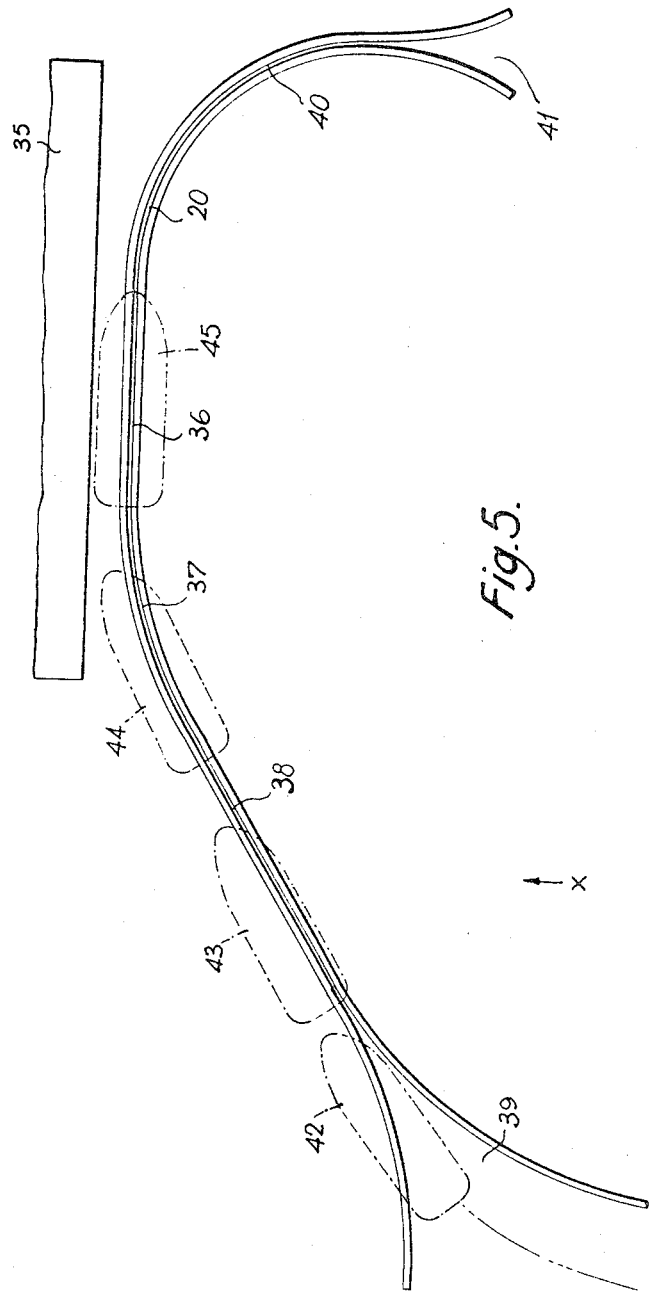

The invention will be understood by the following description of certain embodiments, by way of example, in conjunction with the accompanying drawings in which:

FIGURE 1 is a vertical cross-section through the lower part of a vehicle, according to one feature of the invention, on the line 1—1 of FIGURE 2, FIGURE 2 is a horizontal cross-section on the line 2—2 of FIGURE 1, FIGURE 3 is an inverted plan view of the vehicle illustrated in FIGURES 1 and 2, FIGURE 4 illustrates a modification of the arrangement illustrated in FIGURE 2, FIGURE 5 illustrates the docking of a vehicle as illustrated in FIGURES 1, 2 and 3 or FIGURE 4, FIGURE 6 is a plan view of a vehicle according to another feature of the invention, FIGURE 7 illustrates part of the vehicle illustrated in FIGURE 6 to a larger scale, FIGURE 8 is a plan view of a vehicle according to a further feature of the invention, FIGURE 9 is a cross-section on the line 9—9 of FIGURE 8, and FIGURE 10 illustrates a part of the vehicle illustrated in FIGURE 9 to a larger scale.

As illustrated in FIGURE 1, a guide 1 depends below the bottom surface 2 of the vehicle 3. A roller 4 is mounted on the lower part of the guide 1, and the guide is attached at its upper end to a carriage 5. The carriage can move sideways on rails 6 which are engaged by wheels 7 mounted on the carriage 5. Attached to the top of the carriage 5 are two wire ropes 8 and 9.

The wire ropes 8 and 9 connect the carriage 5 to the means which tend to oppose movement of the carriage 4 and act to return it to a predetermined position, and the arrangement can be seen in FIGURE 2. The wire ropes 8 and 9 pass round grooved pulleys 10 and are connected to mechanical advantage devices in the form of rope and pulley systems 11 and 12 respectively. The rope and pulley systems are in turn attached to the inner ends of springs, indicated diagrammatically at 13 and 14, the springs being attached at their outer ends to the structure of the vehicle. The rope and pulley systems 11 and 12 are used to reduce fairly long movements of the wire ropes 8 and 9 to short movements of the spring.

The guide 1 is normally retracted, for example by an hydraulic jack 15 which causes the guide 1 to slide vertically up through the carriage 5. Only the roller 4 will then project below the bottom surface 2, and by mounting the rails 6 higher away from the bottom surface, the roller can also be raised above the bottom surface. The guide 1, through the roller 4, engages a path defining groove 20 formed in the ground surface 21. The groove can be formed of concrete and is conveniently slightly wider than the diameter of the roller 4 so that the roller engages with either one side of the groove or the other.

The vehicle is normally supported above the surface 21 by a cushion of pressurised gas formed in the space 22, being contained at its periphery by curtains of moving air 23 issuing from a supply port 24 formed in the bottom surface 2. To avoid leakage of the cushion into the vehicle, the guide 1 is positioned at the rear of the vehicle outside the cushion periphery.

To control the orientation of the vehicle relative to the path defining groove 20, two guides can be provided. FIGURE 3 is an inverted plan view of the vehicle illustrated in FIGURES 1 and 2 and shows one guide 1 at the rear of the vehicle and a further guide 1 at the front of the vehicle.

It will be appreciated that FIGURES 1 and 2 illustrate an arrangement very diagrammatically, and other means of applying a force which opposes movement of the guide 1 can be used. Normal alternatives are hydraulic and pneumatic jacks or rams. FIGURE 4 illustrates a modification in which the guide 1 is attached to the piston 25 of a hydraulic ram 26. The guide is attached to the piston 25 by wire ropes 27 which pass round pulleys 28. Pressure accumulators 29 are connected to each end of the ram 26. The wires pass through seals 30 at each end of the ram. As the piston moves in the ram, the pressure in the accumulator towards which the piston is moving will increase, the pressure in the other accumulator decreasing. A force which resiliently opposes the movement of the piston 25, and thus the guide 1, is provided by the varying of the pressures in the accumulators.

Guides can also be positioned within the cushion but in this case sealing means would be required. A convenient arrangement would be for the carriage to move in a duct, open at the bottom, and closed at the ends, the wire ropes 8 and 9 passing through seals in the ends of the duct. It would also be possible, particularly where the cushion is compartmented by transverse curtains of moving air, for a guide 1 to protrude down through a supply port through which air flows to form a curtain. The carriage 5 and the rails 6 could then be housed in the duct supplying air to the supply port.

The application of the invention can be understood from FIGURE 5. The groove 20 extends in front of a dock 35 at a distance therefrom such that a vehicle when in the correct position relative to the groove is just clear of the edge of the dock. If vehicles of different widths are to be accommodated, the groove 20 can be spaced from the dock 35 a sufficient distance to suit the widest vehicles, narrower ones being reached by short gangplanks.

The groove 20 extends parallel to the dock at 36, and then curves round and away from the dock at each end. As illustrated in FIGURE 5, it is arranged for vehicles to come in at the left hand side and to depart from the right hand side. The groove at the left hand side curves away from the dock at 37, then has a straight length 38, the purpose of which will be explained later. The groove is then flared out to a wide entry portion at 39. At the right hand end the groove curves round at 40 and has a short flared exit portion 41.

In operation, a vehicle approaches the entry portion 39, putting down one or more members 1 as in FIGURE 1. Assuming a side wind in the direction of the arrow X, the vehicle will have a sideways drift. Initially, the guide or guides, depending below the vehicle will contact the far side of the groove. For example, as shown at 42, if the vehicle has two downward depending guides, one at the front and one at the rear, the front guide will have contacted the far side of the groove and moved across the bottom of the vehicle, slowing down the sideways drift of the front of the vehicle. The guide at the rear of the vehicle would just be about to come into contact with the far side of the groove. The result would be to turn the vehicle to the required direction for moving along the groove and at the same time slow down and eventually stop the sideways drift. The vehicle would then be at the position 43, and would enter the straight length 38. This straight length provides sufficient distance of travel for the downward depending guides to be returned to their predetermined positions, generally on the fore and aft axis of the vehicle, moving the vehicle sideways relative to the groove so that, as the vehicle travels round the curved portion 37, as shown at 44, it is correctly and accurately positioned relative to the dock 35, as at 45.

When leaving, the vehicle traverses the curved portion 40 and loses contact with the groove 20 at the exit portion 41. For one way operation, the exit end, that is the right hand end of the groove, can be shorter. If it is desired to be able to operate in both directions, then both ends should be the same, i.e. both ends should be as the left hand end in FIGURE 5.

Instead of the straight portion 38, a curved portion can be provided but the radius of the curve should be large enough to ensure that the sideways force created by the movement of the vehicle round the curve at the speed desired will not be so large that the members are not returned to, or maintained at, their predetermined position.

The guides on the vehicle plus the means for opposing the movement of the guides can deal with sideways drift in both directions, whether caused by side-winds or by the fact that the vehicle turns as it approaches the dock. The vehicle is able to approach the flared end rapidly and easily and is quickly brought into the correct position for docking. The vehicle can be held in position without further ropes or the like, and can quickly and easily depart.

The forming of the guiding means in the surface as a groove provides a smooth surface on which the vehicle can settle when the cushion is not in existence. However, if desired, the guiding means can be in the form of a rail or the like projecting above the surface. In such an arrangement pairs of downwardly depending guides are provided, one guide on one side of the guiding means and the other guide on the other side. Means are then provided for moving the guides apart towards the sides of the vehicle as the vehicle approaches the beginning on the rail so that it can readily be engaged, the guides then moving into engagement with the rail.

FIGURE 6 illustrates an alternative form of vehicle 51 which is positioned alongside a dock or similar terminal structure 52 by guides attached to the sides of the vehicle. The vehicle is positioned relative to the structure 52 by guides comprising wheels 53 mounted on arms 54 which, in turn, are pivotally mounted on the vehicle 51. As the vehicle approaches the structure 52, the wheels 53 and arms 54 extend out from the side of the vehicle. On contact with the structure, the arms deflect inwards against some suitable opposing force such as springs or hydraulic rams 55, any sideways movement of the vehicle eventually being stopped. Once any sideways movement has been stopped, the arms may be retained in their deflected position, the vehicle moving along parallel to the structure. Alternatively, the arms can be allowed to move outwards, the gap between the vehicle and the structure being bridged by a gangway.

Guides comprising wheels 53 and arms 54 are normally provided on both sides of the vehicle and during normal operation of the vehicle can be retracted as indicated at 56.

The arrangement of the guides can more clearly be seen in FIGURE 7. The inner end of the arm 54 is pivotally attached to the vehicle body at 57, the outer end of the arm carrying the wheel 53. The ram 55 is pivotally attached at one end 58 to the arm 54 and at the other end 59 to the vehicle body. A fluid under pressure is supplied to the ram by a pipe 60 via a change-over valve 61. The fluid can be supplied direct to the inner end of the ram via pipe 62, the pressure in the ram then extending the arm to the position indicated at 63. By changing over the valve 61, the fluid can be supplied to the outer end of the ram via pipe 64 and the arm will then be retracted. The movement of the ram 55 and valve 61 is insufficient to interfere with the operation of the valve.

The vehicle can approach the structure 52 with an orientation which can vary over a wide range and may also have sideways movement, but will be guided to the correct orientation and position relative to the structure 52 rapidly and accurately without damage to the vehicle.

FIGURES 8 and 9 illustrate a further, alternative embodiment in which the vehicle has a guide in the form of an inflatable member 70 attached to the side of the vehicle, part of the member 70 being shown in more detail in FIGURE 10. Two ports 71 and 72 (FIGURE 10) are formed in the outer surface of the member 70, spaced apart vertically, and extending the length of the member. The two ports unite at each end of the member and air or other gas issues from the ports to form curtains of air or gas 73 which enclose a space 74 in which a cushion of pressurised gas can be formed when the member 70 is adjacent to the structure 75.

The member 70 is inflated by air or other gas from a compressor on the vehicle and, conveniently, the inflating gas can be used to form the curtains 73, although separate supplies of air or other gas to the ports 71 and 72 can be provided.

As the vehicle moves into contact with the structure 75, the outer surface of the member is prevented from actual contact by the cushion of pressurised gas formed in the space 74 and the member 70 deflects, as indicated by the dotted line 76, to adsorb any sideways movement of the vehicle. The space 74 and thus the cushion of pressurised gas, can be divided into separate compartments by transverse ports or flexible members. The vehicle can be brought into the correct orientation and position relative to the structure 75, rapidly and accurately.

Instead of the cushion space 74 being bounded by gaseous curtains, it can be bounded by thin flexible members or by a combination of flexible members and gaseous curtains.

And inflatable member 70 is normally provided on each side of the vehicle and when the vehicle is not at a dock or other terminal it can be deflated and held against the side of the vehicle as at 78 in FIGURE 9.

To provide a side force which will tend to maintain the vehicle against the structure 75, when this on a land surface, the surface over which the vehicle will be supported can be slightly inclined downwards towards the structure, as illustrated at 77 in FIGURE 3. The angle of inclination can vary from position to position and may extend for a considerable distance as an aid to positioning the vehicle.

An advantage of an inclined surface is that it will assist in off-loading vehicles, and ensure that, when drivers are embarking their vehicles, they will engage a brake to ensure that their vehicle will remain stationary. When the vehicle remains over a water surface some other means may be provided to give a sideways thrust to maintain the vehicle against the structure 75.

An alternative arrangement for producing a side force on the vehicle which will tend to maintain the vehicle close to the terminal structure is to provide means for producing one or more areas of reduced pressure between the terminal structure and the vehicle. For example, one or more pads may be provided on the vehicle having ports formed in the surfaces thereof and bounding an area of each pad, the ports being inclined outwards. A gas issuing from the ports will form outward flowing curtains of gas flowing across the gaps between the pads and the terminal structure, which will form and maintain a reduced pressure over the areas on the pads. The reduced pressure areas will hold the vehicle in close proximity to the terminal structure. Such means may be used in conjunction with the positioning devices described above or can be used independently. Each pad could have one or more wheels positioned within the lower pressure area to act as a positive positioning member.

A position device can be provided on the structure 75 which, by mechanical or other means, produces a signal which shuts off the propulsion means when the vehicle has reached the required position.

Although the arrangements described above and illustrated in the drawings are for gas-cushion supported vehicles in which the cushion is contained by curtains of moving air, or other fluid, the invention is also applicable to vehicles in which the cushion is contained by one or more flexible walls or members depending below the bottom of the vehicle, or by combinations of flexible walls or members and fluid curtains.

I claim:

1. A gas cushion vehicle for travelling over a surface a portion of which is provided with means for defining the path of travel of the vehicle, said vehicle having a body and means for forming and maintaining at least one cushion of pressurised gas beneath the body for supporting the body above the surface over which the vehicle is to travel, comprising at least one transverse guiding means in the underside of said body, a transversely movable guide member mounted for movement along said guiding means, said guide member being adapted to cooperate with said path defining means to guide the vehicle along said path, and resilient means connected to the vehicle body and to the guide member, said resilient means yieldably opposing relative transverse movements of the guide member and the body from a datum relative transverse position, whereby when said guide member is in cooperation with said path defining means, the vehicle body is urged to a datum transverse position relative to the path defining means.

2. A vehicle according to claim 1 wherein said guide member is mounted for vertical movement relative to the vehicle body between an upper inoperative position and a lower operative position, and including means operable to raise the guide member to said inoperative position and to lower the guide member to said operative position for cooperation with said path defining means.

3. A vehicle according to claim 1 wherein said resilient means comprises pressure accumulators connected to opposite transverse sides of the guide member which urge the guide member in opposite transverse directions relative to the vehicle body.

4. A gas cushion vehicle having a body and means for forming and maintaining at least one cushion of pressurised gas beneath the body for supporting the body above a surface over which the vehicle is to travel, a portion of said surface being provided with means for defining the path of travel of the vehicle, the body of said vehicle having at least one transverse slot in its underside, a guide member transversely movable in said slot adapted for cooperation with said path defining means to guide the vehicle along said path, a mechanical advantage device connected to said guide member, and resilient means connecting said mechanical advantage device to the vehicle body for yieldably maintaining said guide member in a datum transverse position relative to the body, said mechanical advantage device causing movements of said resilient means corresponding to, but smaller than, the transverse relative movements of said guide member, whereby when said guide member is in cooperation with said path defining means, the vehicle body is urged to a datum position relative to the path defining means.

5. A vehicle according to claim 4 wherein said guide member is mounted for vertical movement, and including means operable to raise the guide member upwards through the slot to an inoperative position and to lower the guide member to an operative position for cooperation with said path defining means.

6. A gas cushion vehicle having a body and means for forming and maintaining at least one cushion of pressurised gas beneath the body for supporting the body above a surface over which the vehicle is to travel, a portion of said surface being provided with means for defining the path of travel of the vehicle, said vehicle having at least one system for positioning the vehicle relative to said path defining means, said system including a transverse slot in the underside of said body, a guide member disposable in an operative position in which it projects downwardly from said body through said slot for cooperation with said path defining means to guide the vehicle along said path, said guide member being mounted on, and vertically movable relative to, a carriage, means connected to said guide member and to said body for raising and lowering said guide member between its operative position and an inoperative position, respectively, first resilient means connected to the vehicle body and to one transverse side of said carriage, second resilient means connected to the vehicle body and to the opposite transverse side of said carriage, whereby the guide member is resiliently urged to a datum transverse position relative to said body, and transverse guiding means including a slot in the underside of the vehicle body which constrain the carriage to move only in directions transverse to the body, whereby when said guide member is in cooperation with said path defining means, the vehicle body is urged to a datum transverse position relative to the path defining means.

7. A vehicle according to claim 6 wherein the guide member is adapted to extend into a path defining groove in said surface, and the slot in the underside of the vehicle body is normally transverse to said groove.

8. A vehicle according to claim 7 wherein said guide member includes a roller rotatably mounted for rotation about a substantially vertical axis and adapted to rollably engage against a side of said groove.

9. A vehicle according to claim 6 in which the path defining means comprises at least one rail relative to which the slot in the underside of the body is normally transverse, said guide member having means for cooperating with said rail.

References Cited by the Examiner
UNITED STATES PATENTS

| | | | |
|---|---|---|---|
| 2,985,114 | 5/1961 | Lindner | 105—141 |
| 2,985,479 | 5/1961 | Ortega et al. | 104—247 X |
| 3,086,479 | 4/1963 | Kucher | 104—134 |
| 3,164,103 | 1/1965 | Lathers et al. | 104—134 |
| 3,174,440 | 3/1965 | Cockerell | 104—120 |

ARTHUR L. LA POINT, *Primary Examiner.*

F. W. MONAGHAN, R. M. WOHLFARTH,
*Assistant Examiners.*